Figure 1:
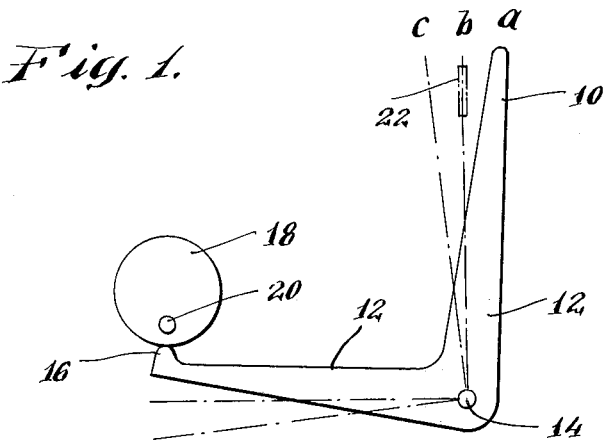

Jan. 4, 1966       M. J. E. GOLAY       3,227,036
RADIATION CHOPPING SYSTEM
Filed July 24, 1961

INVENTOR.
Marcel J. E. Golay
BY
Gerald E. Bramblett Jr.
ATTORNEY.

3,227,036
RADIATION CHOPPING SYSTEM
Marcel J. E. Golay, 116 Ridge Road, Rumson, N.J.
Filed July 24, 1961, Ser. No. 126,231
4 Claims. (Cl. 88—14)

This invention relates to method and apparatus for periodically interrupting, or "chopping" a beam of radiation.

In radiation measuring apparatus as, for example, infrared spectrophotometers, it is customary to chop the radiation so as to provide at the detector a pulsating signal distinguishable from unwanted "background." This background may consist of radiation from two different regions: (1) radiation emanating or reflected from the chopper itself, and (2) radiation from the immediate surroundings.

One type chopper in common use is a disc that is large compared to the beam being chopped and has its peripheral region divided to form either one or a plurality of semicircular or wedge-shaped segments.

The disc-type chopper is not suitable, however, for use in double pass monochromator systems. In these systems, it is necessary to chop the radiation between the first and second passes through the dispersing element. It is almost impossible to fit a standard chopper into the available space. Also, a large fraction of the chopper will be "seen" by the detector. For these reasons, a very small chopper must be employed. In actual practice, for example, one such chopper consists of a small rotating "post" with one side cut away.

In prior art choppers of this type, the chopper has been so located as to periodically move from one side of the entrance slit (or its image), into alignment with the slit, and back to its original position. The effect of a reciprocating motion of this magnitude is to interrupt the radiation emanating from the slit at a frequency $f$. At the same time, it will be apparent that the radiation from any adjoining area that is periodically covered by the chopper will also be chopped at the same frequency. A similar result occurs with respect to any radiation emitted or reflected by the chopper itself. As neither the detector nor the electrical circuit is able to differentiate this unwanted radiation from the desired radiation, baseline "wandering" occurs which becomes a serious problem at certain wavelengths. This undesirable effect has been found experimentally to be particularly serious in the 6–7 micron wavelength region of the electromagnetic spectrum.

It is, therefore, a primary object of this invention to provide method and apparatus for radiation chopping which minimizes the effect of background radiation.

Another object is to provide such a chopper which is physically small.

Another object is to provide a more stable monochromator.

Another object is to provide an improved spectrometer.

Figure 2:
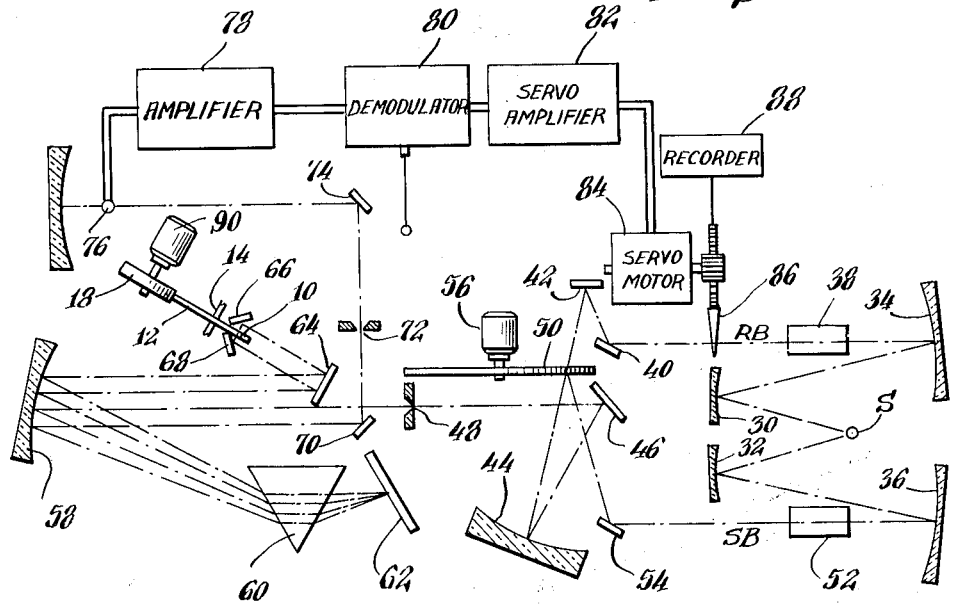

Other objects, features, and advantages will be apparent from the following description, the appended claims, and the figures of the attached drawing wherein:

FIG. 1 illustrates one embodiment of a chopper constructed in accordance with this invention; and FIG. 2 is a schematic diagram of a spectrometer including a double pass monochromator incorporating this invention.

In accordance with this invention, a beam of radiation is periodically interrupted by a radiation impermeable shutter. Means are provided for moving the shutter through the beam with an amplitude sufficient to completely pass therethrough upon each interruption, thereby unblocking the beam at the completion of each interruption.

One embodiment of an apparatus suitable for practicing this invention is illustrated in FIG. 1. A shutter 10 is positioned at one extremity of a pivot arm 12 rotatable about a pivot 14. The other extremity of pivot arm 12 carries a cam rider 16 which contacts an eccentric cam 18 rotatable on a shaft 20. Suitable means (not shown), such as a spring, are provided for maintaining cam rider 16 in contact with cam 18. The shutter 10 is so positioned that it sweeps completely across a slit (or slit image) 22. At position $b$, radiation from slit 22 is completely blocked. At either extreme ($a$, $c$) of movement, however, the slit is completely open.

If it is now assumed that a temperature gradient exists between the areas behind positions $a$ and $c$, the radiation from these regions may be delineated $T_a$ and $T_c$. The radiation from the chopper at each position may be referred to as $C_a$ and $C_c$. It will now be seen that, when the chopper is at position $a$, the detector will "see" background comprising $(C_a + T_c)$. When the chopper is at $c$, the detector will see background comprising $(C_c + T_a)$. Because of the difference in slope and curvature between the blackbody radiation characteristics of the surrounding areas and the chopper, these two quantities are unequal. The net result is that the chopper, in making one complete cycle from $a$ to $c$ and back to $a$, generates a change in background of one cycle. During the same period, however, the radiation from slit 22 is interrupted twice. The detector, then, will receive radiation from the slit 22 at a frequency $f$ and from the background at a frequency $f/2$. These frequencies are easily separated by suitable electronic circuitry so as to record only slit radiation.

A spectrophotometer embodying this invention is illustrated in FIG. 2 and comprises a source of radiation S, from which radiation travels to spherical mirrors 30 and 32 to be reflected thereby upon respective spherical mirrors 34 and 36. The mirror 34 produces a reference beam RB, which passes through a cell 38 which may be evacuated to constitute a non-absorbing reference and is then directed by plane mirrors 40, 42 to a spherical mirror 44. From mirror 44 the beam travels to plane mirror 46 and is directed thereby upon an entrance slit 48. A chopping disc 50 lies in the path of the radiation between mirrors 42 and 44. The disc is of the semi-circular type so disposed that, during one-half of each revolution, it cuts off the radiation between the two mirrors 42 and 44 and, in the other half of the revolution, it passes the radiation.

The mirror 36 forms the radiation falling thereon into a sample beam SB, which passes through a cell 52 containing a sample of the unknown substance and is then directed by a plane mirror 54 toward the chopping disc 50 driven by a motor 56. During that half of its revolution when disc 50 is passing radiation from mirror 42 to mirror 44, the radiation from mirror 54 is continuing along its course past the disc. The face of the disc 50 presented to the sample beam is reflecting and, when disc 50 is cutting off the radiation from mirror 42 to mirror 44, the radiation from mirror 54 falls upon the face of the disc and is reflected thereby to mirror 44. The radiation from mirror 44 travels to mirror 46 and is directed upon the entrance slit 48. With this arrangement, the disc 50, which may be referred to as a switching shutter, interrupts the radiation traveling from the source to the detector, so that the reference and sample beams fall alternately upon the entrance slit.

Radiation passing through the entrance slit 48 falls upon a paraboloidal mirror 58, which collimates the radiation and directs it to the dispersing element 60, such as a prism or a grating. The dispersed radiation issuing from the illustrated prism falls upon a Littrow mirror 62, is reflected, and returns through the dispersing element. The dispersed radiation leaving the dispersing element falls upon the mirror 58 and is directed thereby to a plane mirror 64, whence the radiation travels to a diagonal mirror 66. From mirror 66, the radiation passes to a second diagonal mirror 68 and returns by way of mirrors 64 and 58 to the dispersing element for a second dispersion. Radiation issuing from the dispersing element passes again to the Littrow mirror, then back through the prism to mirror 58, by which it is focused, so that, after being turned by plane mirror 70 it falls upon the exit slit 72. The beam issuing from the exit slit is turned by plane mirror 74 and travels to a radiation detector indicated at 76 which produces a signal commensurate with the instantaneous intensity of the radiation impinging thereon.

The output of the detector may be utilized in various ways and, in the system shown, the detector output passes to an amplifier 78 and the amplified signal is then fed to a demodulator 80 which may be, for instance, a bi-directional gated diode bridge operated in synchronism with the switching shutter 50 but at twice the frequency thereof. The demodulated signal goes to a servo-amplifier 82, the output of which is supplied to a servomotor 84. The servomotor operates an attenuator 86 in the reference beam by moving the attenuator in and out of the reference beam to vary the intensity of the beam and thus bring the reference and sample beams into balance. The attenuator is connected to the moving element of a recorder 88 and the record made by the recorder represents the movement of the attenuator required to bring the system to a null condition with the beams in balance. Such attenuator movement is a function of the difference between the intensities of the reference and sample beams.

It will be observed that, in the monochromator of the instrument, mirrors 66, 68 cause radiation falling thereon to return for a second passage back and forth through the prism and the radiation passing from mirror 66 to mirror 68 thus ultimately issues from the exit slit as second pass radiation. At the same time, some amount of first pass radiation, that is, radiation which has traveled only once back and forth through the prism issues through the exit slit. The first and second pass radiations passing through the exit slit are of different wavelengths. The second pass radiation is of approximately twice the dispersion of the first pass radiation and thus has an increased resolution for the same signal-to-noise ratio. The second pass radiation is therefore that which is desired, while the first pass radiation is unwanted. In order to discriminate between the two radiations, the chopper of FIG. 1 is positioned as shown with pivot arm 12 mounted on pivot 14 operated by motor 90 through cam 18. Shutter 10 is positioned at an image of entrance slit 48 located between diagonal mirrors 66 and 68. Shutter 10 is operated at the same frequency as switching shutter 50, but with a phase difference of 90°.

A more complete description of the operation of a double-pass system utilizing a prior art shutter will be found in U.S. Patent 2,900,866 which issued August 25, 1959 to V. J. Coates et al. It will be understood that the theory of operation of the spectrophotometer will be the same whether the chopper of the present invention or the chopper disc there disclosed is employed. However, the improvement in base line stability effected by chopping in accordance with the present invention results in greatly improved system performance.

While the chopping method of the present invention has been particularly described with respect to its utility in double pass spectrometers, it is not to be construed as so limited. This method is applicable wherever it is desired to differentiate desired radiation from unwanted ambient radiation. Furthermore, it is to be understood that the invention is not limited to the particularly described chopper embodiment disclosed. Many variations and modifications falling within the spirit of the invention will be apparent to those skilled in this art. The invention is to be construed as limited only by the scope of the following claims.

I claim:

1. In a radiation measurement system comprising a radiation source, means for forming a radiation beam, and detector means for measuring said beam, the improvement which comprises means for chopping said beam at a frequency different from the frequency of chopping of ambient radiation, said means for chopping including a reciprocating radiation impermeable member and means for moving said member through said beam at an amplitude sufficient to completely pass therethrough upon each interruption, thereby unblocking said beam at the completion of each interruption.

2. In a double pass monochromator comprising a radiation entrance slit, dispersion means for dispersing radiant energy in accordance with its component wavelengths, means for passing radiation from said entrance slit to said dispersion means to effect a first dispersion thereof, chopping means for chopping the first dispersal radiation, means for returning the first-dispersal radiation to said dispersion means to effect a second dispersion thereof, and exit slit means permitting the passage of at least second dispersal radiation from said monochromator, the improvement comprising actuating means for reciprocatingly moving said chopping means through the first dispersal radiation at an amplitude sufficient to completely pass therethrough upon each interruption, thereby unblocking said radiation at the completion of each interruption.

3. The apparatus of claim 2 wherein the movement of said chopping means is substantially normal to said first dispersal radiation.

4. The apparatus of claim 3 wherein said actuating means comprises a cam-operated reciprocating lever arm having said chopping means mounted thereon for reciprocation therewith.

References Cited by the Examiner

UNITED STATES PATENTS

| 2,588,813 | 3/1952 | Dube | 88—19.3 |
| 2,648,249 | 8/1953 | Canada | 88—61 |
| 2,652,742 | 9/1953 | Walsh | 88—14 |
| 2,870,343 | 1/1959 | Golay | 88—14 |
| 2,927,502 | 3/1960 | Watrous | 88—14 |

OTHER REFERENCES

Walsh et al. III: "Multiple Monochromators. III," Journal of the Optical Society of America, vol. 42, No. 7, July 1952, pages 496–500.

Walsh et al. IV: "Multiple Monochromators. IV," Journal of the Optical Society of America, vol. 43, No. 11, November 1953, pages 989–992.

JEWELL H. PEDERSEN, *Primary Examiner.*

FREDERICK M. STRADER, *Examiner.*